(12) United States Patent
Masuda et al.

(10) Patent No.: US 10,242,805 B2
(45) Date of Patent: Mar. 26, 2019

(54) ELECTRONIC DEVICE WITH EXTERNAL TERMINAL

(71) Applicant: TDK CORPORATION, Tokyo (JP)

(72) Inventors: Sunao Masuda, Tokyo (JP); Katsumi Kobayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/471,108

(22) Filed: Mar. 28, 2017

(65) Prior Publication Data

US 2017/0287645 A1  Oct. 5, 2017

(30) Foreign Application Priority Data

Mar. 31, 2016 (JP) .................. 2016-072783

(51) Int. Cl.
*H01G 4/38* (2006.01)
*H01G 4/005* (2006.01)
*H01G 4/12* (2006.01)
*H01G 4/248* (2006.01)

(52) U.S. Cl.
CPC .............. *H01G 4/38* (2013.01); *H01G 4/005* (2013.01); *H01G 4/12* (2013.01); *H01G 4/248* (2013.01)

(58) Field of Classification Search
CPC .......... H01G 4/38; H01G 4/005; H01G 4/248; H01G 4/12
See application file for complete search history.

(56) References Cited

U.S. PATENT DOCUMENTS

| | | | |
|---|---|---|---|
| 6,181,544 B1 * | 1/2001 | Nakagawa | H01G 4/228 361/306.1 |
| 6,191,933 B1 * | 2/2001 | Ishigaki | H01G 4/232 361/309 |
| 8,233,265 B2 * | 7/2012 | Otsuka | H01G 2/06 361/306.3 |
| 9,355,775 B2 * | 5/2016 | Itagaki | H01G 2/065 |
| 2010/0123995 A1 * | 5/2010 | Otsuka | H01G 2/06 361/308.1 |
| 2014/0055910 A1 * | 2/2014 | Masuda | H01G 4/01 361/303 |
| 2014/0345927 A1 * | 11/2014 | Itagaki | H01G 2/065 174/260 |
| 2015/0114697 A1 * | 4/2015 | Murrell | H01G 4/232 174/255 |
| 2018/0033556 A1 * | 2/2018 | Itamochi | H01G 4/30 |

FOREIGN PATENT DOCUMENTS

JP  2001-196260 A   7/2001
JP  WO 2016080350 A1 *  5/2016 ............... H01G 4/30

* cited by examiner

*Primary Examiner* — David M Sinclair
(74) *Attorney, Agent, or Firm* — Oliff PLC (57) ABSTRACT

An electronic device includes a plurality of chip components and an external terminal. The chip components are provided with a terminal electrode formed on an end surface of a ceramic element body. The external terminal is electrically connected with the terminal electrodes to support the plurality of chip components adjacently in a first direction. The external terminal includes a terminal electrode connection part arranged to face the terminal electrode and a mounting connection part connectable with a mounting surface. The terminal electrode connection part is provided with a plurality of convex portions protruding toward the terminal electrode. At least one of the plurality of convex portions is respectively connected with each terminal electrode of the plurality of chip components.

11 Claims, 4 Drawing Sheets

ELECTRONIC DEVICE WITH EXTERNAL TERMINAL

BACKGROUND OF THE INVENTION

1. Field of the Invention

The present invention relates to an electronic device with which external terminals consisting of metal terminals are connected, for example.

2. Description of the Related Art

In addition to an ordinary chip component directly surface-mounted on a board or so by itself, a chip component to which an external terminal such as a metal terminal is attached is proposed as an electronic device having a ceramic element body such as a ceramic capacitor. It is reported that an electronic device to which an external terminal is attached relaxes a deformation stress that a chip component receives from a board and has an effect of protecting the chip component from impact or so after the electronic device is mounted. The electronic devices are used in fields requiring durability, reliability, and the like.

In the electronic device with the external terminal, one end of the external terminal is connected with a terminal electrode of the chip component, and the other end is connected with a mounting surface such as a circuit board by solder or so. For example, Patent Document 1 discloses that the external terminal may be provided with a plurality of chip components.

In the conventional structure, however, the solder thickness between external terminals of multiple chip components and a terminal electrode is hard to be constant, and there are thus problems that joint failure occurs easily, and thermal shock resistance is bad.

Patent Document 1: JP 2001-196260 A

SUMMARY OF THE INVENTION

The prevent invention has been achieved under such circumstances. It is an object of the invention to provide an electronic device having less joint failure and excelling in thermal shock resistance.

To achieve the above object, the electronic device according to the present invention is an electronic device including:

a plurality of chip components with a terminal electrode formed on an end surface of a ceramic element body; and an external terminal electrically connected with the terminal electrodes to support the plurality of chip components adjacently in a first direction, wherein the external terminal includes:

a terminal electrode connection part arranged to face the terminal electrode; and a mounting connection part connectable with a mounting surface, the terminal electrode connection part is provided with a plurality of convex portions protruding toward the terminal electrode, and at least one of the plurality of convex portions is respectively connected with each terminal electrode of the plurality of chip components.

In the electronic device according to the present invention, at least one of the plurality of convex portions is respectively connected with each terminal electrode of the plurality of chip components. A space between the external terminal and the terminal electrodes of the plurality of chip capacitors has a fixed width between the convex portion and the convex portion, and the solder thickness between the terminal electrodes and the external terminal easily becomes constant by inserting solders in the space. Since the solder thickness can become constant, joint failure is hard to occur, and thermal shock resistance is improved.

Preferably, the terminal electrode connection part of the external terminal has a multilayer structure of at least two metals. The terminal electrode connection part may be configured by a clad material having a multilayer structure of two layers or three layers, for example. In this configuration, an equivalent series resistance (ESR) can be improved while a stress at a solder connection part can be reduced. Incidentally, the term of metals in the present invention is used as a concept including alloys as well.

Preferably, the convex portions have an arrangement pitch interval of 2 mm or less. When the pitch intervals are small, joint failure is harder to occur, and thermal shock resistance is further improved. It is further possible to prevent wet spreading of the solder.

Preferably, the terminal electrode has a cover film containing tin, and side surfaces of the terminal electrodes touching each other adjacently in the first direction are joined by tin and tin. The convex portions have a function of preventing wet spreading of the solder, and the solder is thus prevented from reaching the connection portion of the side surface electrode parts of the terminal electrodes adjacently arranged in the first direction.

However, tin and tin are melted and joined between the side surfaces of the terminal electrodes due to heat of the solder joint, and the side surfaces of the terminal electrodes are joined integrally. Since the solders do not reach the space between the terminal electrodes adjacently touching each other in the Z-axis direction, cracks due to the reach of the solders can be prevented.

DESCRIPTION OF THE PREFERRED EMBODIMENTS

Hereinafter, the present invention will be described based on embodiments shown in the figures.

First Embodiment

Figure 1:
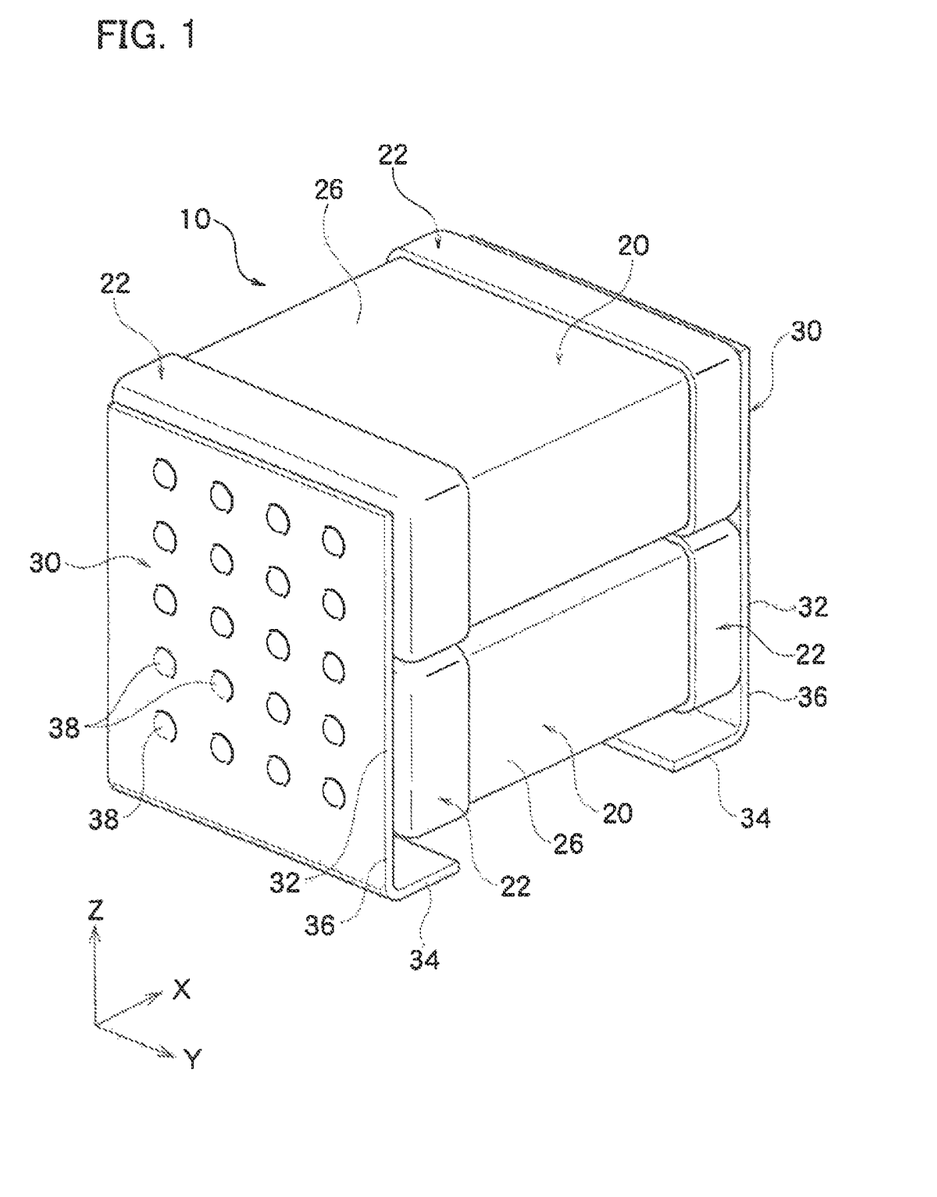
FIG. 1 is a perspective view of an electronic device according to an embodiment of the present invention.

FIG. 1 is a schematic perspective view showing an electronic device 10 according to First Embodiment of the"

present invention. The electronic device 10 has two or more chip capacitors (chip components) 20 adjacent to each other in the Z-axis direction (first direction) and a pair of metal terminals (external terminals) 30 respectively attached to both end surfaces of each chip capacitor 20 in the X-axis direction.

Incidentally, each embodiment will be explained based on an electronic device where a pair of the metal terminals 30 is attached to two chip capacitors 20, but a ceramic electronic device of the present invention is not limited to the electronic device, and may be an electronic device where the metal terminals 30 are attached to a chip component other than a capacitor.

The chip capacitor 20 has a capacitor element body 26 and a pair of terminal electrodes 22 respectively formed on both end surfaces of the capacitor element body 26 in the X-axis direction. The capacitor element body 26 has four side surfaces approximately vertical to the end surfaces in the X-axis direction.

Figures 2A, 2B, 2C:
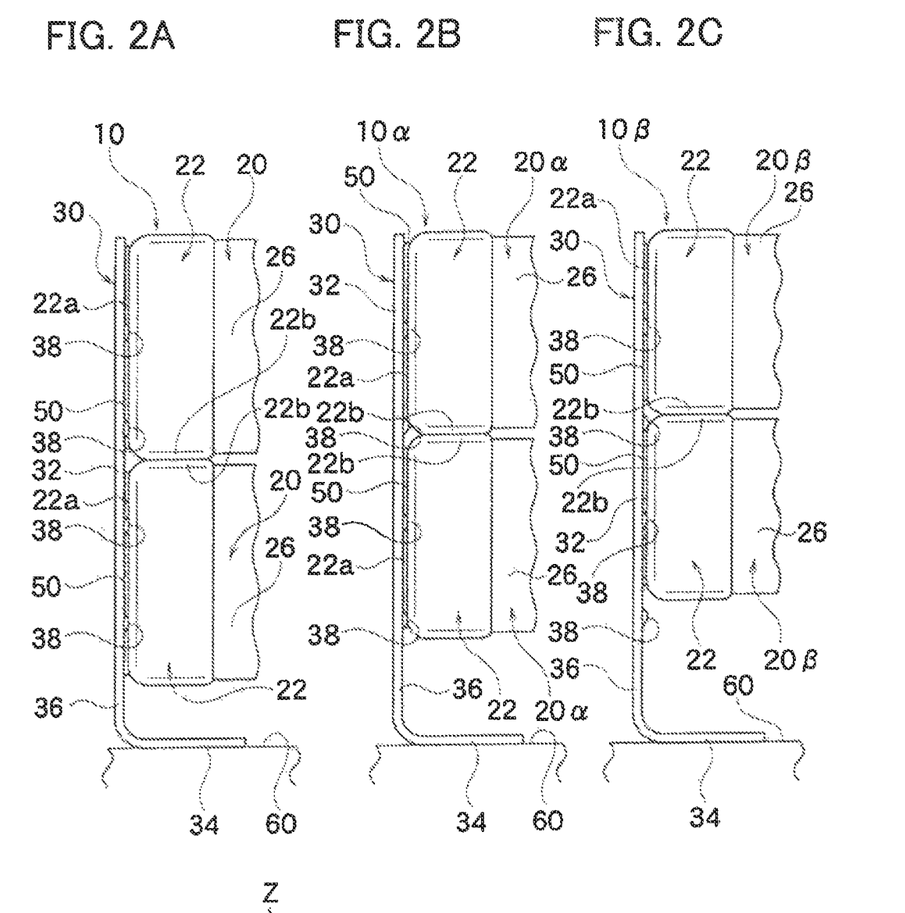
FIG. 2A is a side view of a main part of the electronic device shown in FIG. 1.
FIG. 2B is a side view of a main part of an electronic device according to another embodiment of the present invention.
FIG. 2C is a side view of a main part of an electronic device according to further another embodiment of the present invention.

In the respective drawings, the X-axis, the Y-axis, and the Z-axis are vertical to each other, and the Z-axis is a vertical direction to the mounting surface 60 shown in FIG. 2A to FIG. 2C, the X-axis is a vertical direction to the end surfaces of the element body 26, and the Y-axis is a width direction of the metal terminals 30.

The capacitor element body 26 has dielectric layers as ceramic layers and internal electrode layers therein, and the dielectric layers and the internal electrode layers are alternately laminated. One of adjacent internal electrode layers is connected with one of the terminal electrodes opposing to each other in the X-axis direction, and the other internal electrode layer is connected with the other terminal electrode. Incidentally, the dielectric layers and the internal electrode layers may be alternately laminated along the Z-axis direction, and the dielectric layers and the internal electrode layers may be alternately laminated along the Y-axis direction. The lamination direction is not limited.

The dielectric layer is made by any material and is, for example, constituted by a dielectric material, such as calcium titanate, strontium titanate, barium titanate, and mixture of these. Each of the dielectric layers has any thickness, but normally has a thickness of several μm to tens of several hundred μm.

The conductor material contained in the internal electrode layers is not limited, and a comparatively cheap base metal can be used if the constituent material of the dielectric layers has reduction resistance. The base material is preferably Ni or a Ni alloy. The Ni alloy is preferably an alloy of Ni and one or more elements selected from Mn, Cr, Co, and Al, and Ni in the alloy is preferably contained at 95 wt % or more. Incidentally, various kinds of fine components, such as P, may be contained at about 0.1 wt % or less in Ni or the Ni alloy. The internal electrode layers may be formed using a commercially available electrode paste. The thicknesses of the internal electrodes are appropriately determined depending upon usage or so.

The terminal electrodes 22 are also made by any material and is normally made by copper, copper alloy, nickel, nickel alloy, or the like, but may be also made by silver, an alloy of silver and palladium, or the like. The terminal electrodes 22 also have any thickness, but normally have a thickness of about 10 to 50 μm. Incidentally, at least one metal cover film selected from Ni, Cu, Sn etc. may be formed on the surfaces of the terminal electrodes 22. In particular, the metal cover film is preferably a multilayer structure of Cu baked layer/Ni plating layer/Sn plating layer.

In the present embodiment, the terminal electrodes 22 may be constituted by multilayer electrode films having at least a resin electrode layer. The terminal electrodes 22 having a resin electrode layer is preferably composed of baked layer/resin electrode layer/Ni plating layer/Sn plating layer from the contacting side against the element body 26, for example.

As shown in FIG. 2A to FIG. 2C, the terminal electrodes 22 have end surface electrode parts 22a and side surface electrode parts 22b. The end surface electrode parts 22a are positioned respectively on both end surfaces in the X-axis direction of the element body 26 to cover the end surfaces. The side surface electrode parts 22b are formed integrally with the end surface electrode parts 22a to cover the element body 26 from the end surfaces to a plurality of the side surfaces near the end surfaces with a predetermined cover width. In the present embodiment, the side surface electrode parts 22b may not substantially be formed, and the terminal electrodes 22 may be substantially constituted by only the end surface electrode parts 22a.

As shown in FIG. 1 and FIG. 2A to FIG. 2C, each of the metal terminals 30 has a terminal electrode connection part 32 and a mounting connection part 34. The terminal electrode connection part 32 is arranged to face the end surface electrode parts 22a of the terminal electrode 22 formed on the end surface of the element body 26 in the X-axis direction. The mounting connection part 34 is connectable with the mounting surface. As shown in FIG. 2A, the terminal electrode connection part 32 and the mounting connection part 34 are linked by a link part 36 formed integrally with them so that the bottom side surface of the element body 26 closest to the mounting surface 60 is spaced from the mounting surface 60 with a predetermined distance.

The link part 36 has a bent shape bending from the terminal electrode connection part 32 to the direction of the bottom side surface (inside) so that the mounting connection part 34 opposes to the bottom side surface with a predetermined distance.

Figure 3:
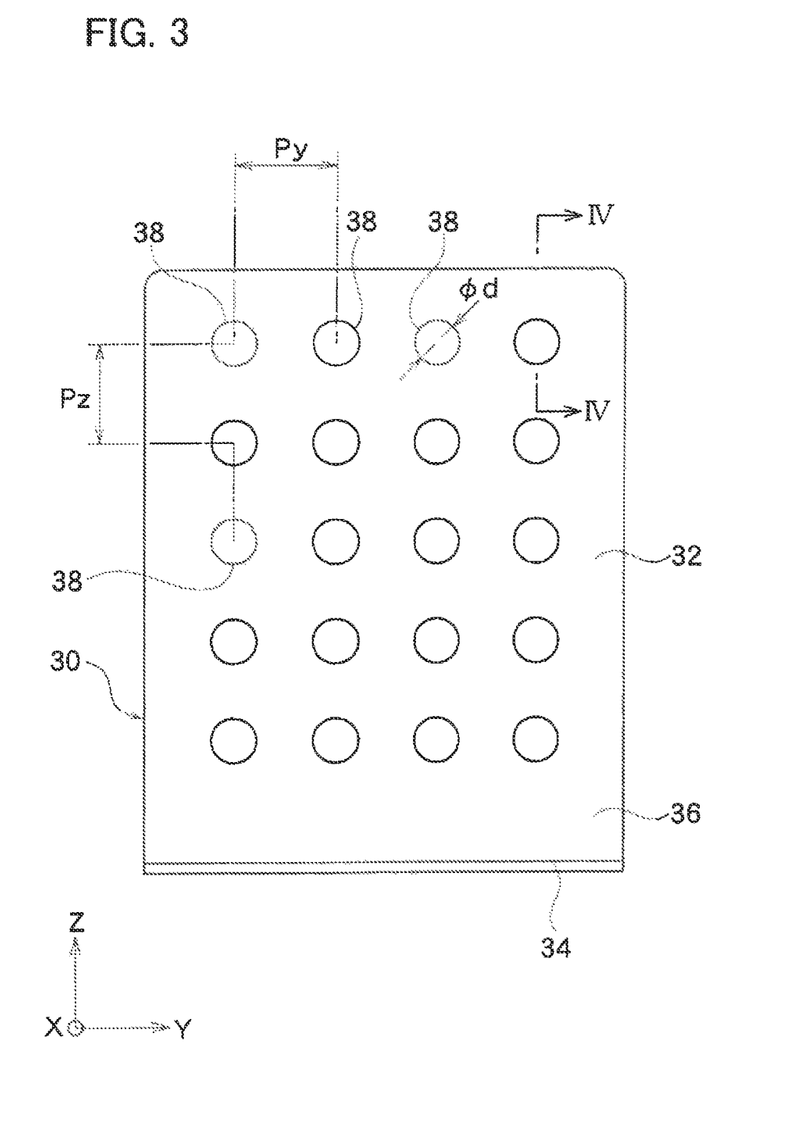
FIG. 3 is an inner front view of an external terminal used for the electronic device shown in FIG. 1.

As shown in FIG. 1 and FIG. 2A, the terminal electrode connection part 32 of the metal terminal 30 is connected with a plurality of the terminal electrodes 22 by solders 50 to support a plurality of the chip capacitors 20 adjacently in the Z-axis direction. In the present embodiment, as shown in FIG. 2A and FIG. 3, the terminal electrode connection part 32 of the metal terminal 30 is provided with a plurality of convex portions 38 protruding toward the terminal electrodes 22. At least one convex portion 38 of the plurality of convex portions 38 is respectively connected with each terminal electrode 22 of the plurality of chip capacitors 20.

Figure 4:
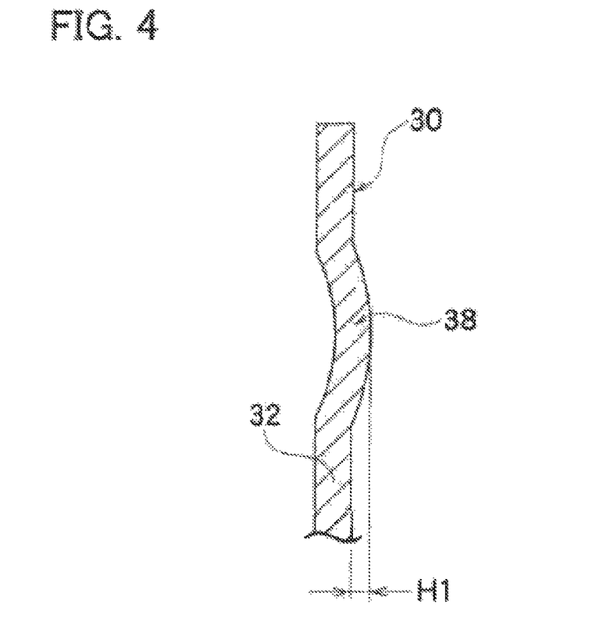
FIG. 4 is a cross sectional view of the main part along IV-IV line shown in FIG. 3.

The convex portions 38 are easily formed by performing a mechanical processing, such as punching, against a metal plate constituting the terminal electrode connection part 32. A protruding height H1 of the convex portion 38 from the inner surface of the terminal electrode connection part 32 shown in FIG. 4 corresponds to the thickness of the solder 50 shown in FIG. 2A, and is preferably 20 to 120 μm. The height H1 of the convex portion 38 is preferably substantially equal among the plurality of convex portions 38.

As shown in FIG. 3, the convex portions 38 preferably have an arrangement pitch interval Py in the Y-axis direction of 2 mm or less. Likewise, the convex portions 38 preferably have an arrangement pitch interval Pz in the Z-axis direction of 2 mm or less. The arrangement pitch interval Py and the arrangement pitch interval Pz of the convex portions 38 are respectively a distance between centers of the convex portions 38 adjacent to each other, and may be the same as or different from each other. Minimum values of the arrangement pitch interval Py and the arrangement pitch interval Pz depend upon outer diameters $\Phi d$ of the convex portions 38, but is preferably determined so that each of the convex portions 38 adjacent to each other does not completely become continuous.

The convex portions 38 preferably have a hemispherical shape, and in this case, the convex portions 38 preferably have an outer diameter $\Phi d$ of 0.2 to 0.8 mm. The shape of the convex portions 38 is not limited to hemisphere, but may be arc surface, semi-ellipse sphere, cone with rounded tip, pyramid with rounded tip, trapezoid, or the like. When the convex portions 38 have a shape other than hemisphere, the convex portions 38 have a size in a range where an inscribed circle of the shape of the convex portions 38 corresponds to the outer diameter $\Phi d$ in viewing the convex portions 38 from the X-axis direction.

The shape and size of the chip capacitors 20 are appropriately determined depending upon object and usage. When the chip capacitors 20 have a rectangular parallelepiped shape, the chip capacitors 20 normally have a size of about length (1.6 to 7.5 mm)×width (0.8 to 6.3 mm)×thickness (0.5 to 3.5 mm).

Manufacturing Method of Electronic Device 10

Hereinafter, a manufacturing method of the electronic device 10 will be described. First, the chip capacitor 20 is manufactured. A green sheet paint is prepared to form a green sheet to be a dielectric layer after being fired. In the present embodiment, the green sheet paint is composed of an organic solvent based paste obtained by kneading a raw material of a dielectric material and an organic vehicle, or is composed of an aqueous paste.

The raw material of the dielectric material is various kinds of compounds to be calcium titanate, strontium titanate, or barium titanate after being fired appropriately selected from carbonate, nitrate, hydroxide, organic metal compound, or the like, and these may be mixed and used.

Next, the above-mentioned green sheet paste is used to form a green sheet on a carrier sheet. Next, an electrode pattern to be the internal electrode layer after being fired is formed on one of the surfaces of the green sheet. The electrode pattern is formed by any method, such as a printing method, a transfer method, and a thin film method. The electrode pattern is formed on the green sheet and dried to obtain a green sheet with the electrode pattern.

A conductor material used for manufacturing an internal electrode layer paste is preferably Ni, a Ni alloy, or a mixture of these. The conductor material has any shape, such as spherical shape and scale shape, and may have a shape where these shapes are mixed.

Next, the green sheet with the internal electrode pattern is peeled from the carrier sheet and laminated to a desired lamination number so as to obtain a green laminated body. Incidentally, an external layer green sheet with no internal electrode pattern is laminated at the first and last laminations.

Thereafter, the green laminated body is finally pressurized and is polished as necessary for a debinding treatment. Then, a green chip is fired under any conditions. The green chip is subjected to an annealing treatment, polishing, and the like as necessary after being fired so as to obtain a capacitor element body 26 shown in FIG. 1.

Thereafter, terminal electrodes 22 are formed on the capacitor element body 26. For example, the terminal electrode 22 is manufactured in a manner that a terminal electrode paste is baked to form a base electrode, and that a metal cover film is formed on the surface of the base electrode by plating. Incidentally, the terminal electrode paste can be prepared in the same manner as the above-mentioned internal electrode layer paste.

When the terminal electrode 22 having a resin electrode layer is formed, for example, the base electrode consisting of a baked layer is formed on the end surface of the element body 26, and a resin electrode paste film is thereafter applied thereto, whereby the resin electrode layer is formed. After this, a Ni plating layer and a Sn plating layer are formed.

In the manufacture of the metal terminal 30, first, a flat metal plate material is prepared. The metal plate material is any conductive material, but is preferably a copper plate, a copper alloy plate, a nickel alloy plate, aluminum, an aluminum alloy, zinc, a zinc alloy, or the like.

Next, the metal plate material is mechanically machined so as to obtain the metal terminals 30 shown in FIG. 1 and FIG. 3. The metal plate material is machined by any method, but is preferably machined by pressing. The convex portions 38 can be formed at the same time during pressing. A metal cover film by plating may be formed on the surfaces of the metal terminals 30.

The material used for the plating is not limited, but Ni, Cu, Sn etc. is used, for example. The thickness of the metal cover film by plating is preferably one third or less of the thickness of the first metal 30a.

The plurality of chip capacitors 20 obtained in the above manner is arranged adjacent to each other in the Z-axis direction, and the terminal electrode connection part 32 of the metal terminal 30 is connected with the end surface electrode parts 22a of the terminal electrodes 22 formed on both end surfaces of the chip capacitors 20 in the X-axis direction. As shown in FIG. 2A, these are connected by the solders 50 in the present embodiment. The solders 50 are preferably applied in advance to the end surface electrode parts 22a of the terminal electrodes 22. Alternatively, the solders 50 are preferably applied in advance to inner surfaces of the metal terminals 30 corresponding to the end surface electrode parts 22a of the terminal electrodes 22 with areas corresponding to areas of the respective end surface electrode parts 22a.

In the electronic device 10 according to the present embodiment, at least one of the plurality of convex portions 38 is respectively connected with each terminal electrodes 22 of the plurality of chip capacitors 20. In FIG. 2A, two convex portions 38 are respectively connected with the terminal electrodes 22 of the chip capacitors 20 along the Z-axis direction. As shown in FIG. 3, at least four convex portions are connected with each of the terminal electrodes 22 along the Y-axis direction.

In the present embodiment, as shown in FIG. 2A, a space between the metal terminal 30 and the terminal electrodes 22 of the plurality of chip capacitors 20 has a fixed width between the convex portion 38 and the convex portion 38, and the solder thickness between the terminal electrodes 22 and the metal terminal 30 easily becomes constant by inserting the solders 50 in the space. Since the solder thickness can become constant, joint failure is hard to occur, and thermal shock resistance is improved.

In the present embodiment, both of the arrangement pitch intervals Pz and Py of the convex portions 38 are 2 mm or less. When the pitch intervals are small, joint failure is harder to occur, and thermal shock resistance is further improved. It is further possible to prevent wet spreading of the solders.

In the present embodiment, the terminal electrodes 22 have a plating cover film containing tin, and the side surface electrode parts 22b of the terminal electrodes 22 adjacently touching each other in the Z-axis direction are mutually melted and joined by tin and tin. The convex portions 38 positioned close to the side surface electrode parts 22 have a function of preventing wet spreading of the solders, and the solders are thus prevented from reaching the connection portion of the side surface electrode parts 22b of the terminal electrodes 22 adjacently arranged in the Z-axis direction.

However, tin and tin are melted and joined between the side surface electrode parts 22b of the terminal electrodes 22 due to heat of the solder joint, and the side surfaces of the terminal electrodes 22 are joined integrally. Since the solders do not reach the space between the terminal electrodes 22 adjacently touching each other in the Z-axis direction, cracks due to the reach of the solders can be prevented.

Second Embodiment

FIG. 2B is a side view of a main part of an electronic device 10α according to Second Embodiment of the present invention. The electronic device 10α of the present embodiment has the same structure and demonstrates the same effect as the electronic device 10 according to First Embodiment shown in FIG. 1 and FIG. 2A except for the following matters, and common parts are provided with common member codes and are not described.

As shown in FIG. 2B, the present embodiment has the same structure and demonstrates the same effect as the electronic device 10 of First Embodiment except that the length of each chip capacitor 20α arranged up and down in the Z-axis direction is smaller than that of the chip capacitor 20. The metal terminals 30 of First Embodiment may be applied to the metal terminals 30 of Second Embodiment.

Third Embodiment

FIG. 2C is a side view of a main part of an electronic device 10β according to Third Embodiment of the present invention. The electronic device 10β of the present embodiment has the same structure and demonstrates the same effect as the electronic device 10 according to First Embodiment shown in FIG. 1 and FIG. 2A except for the following matters, and common parts are provided with common member codes and are not described.

As shown in FIG. 2C, the present embodiment has the same structure and demonstrates the same effect as the electronic device 10 of First Embodiment except that the length of each chip capacitor 20β arranged up and down in the Z-axis direction is smaller than that of the chip capacitor 20. The metal terminals 30 of First Embodiment may be applied to the metal terminals 30 of Third Embodiment. In this embodiment, however, the convex portion 38 at the lowest position in the Z-axis direction is not connected with the terminal electrode 22, and the terminal electrode 22 of the chip capacitor 20β at the upper position in the Z-axis direction is connected with a single convex portion 38 as seen from the Y-axis direction.

However, the chip capacitor 20β at the upper side is connected with the chip capacitor 20β at the lower side via the side surface electrode parts 22b, and thus the end surface electrode parts 22a of the chip capacitors 20β do not incline toward the inner surface of the terminal electrode connection part 32. Thus, the space between the terminal electrode connection part 32 and the end surface electrode parts 22a is kept constant due to the single convex portion 38 in the Z-axis direction, and the solders 50 also have a constant thickness.

Fourth Embodiment

Figure 5A:
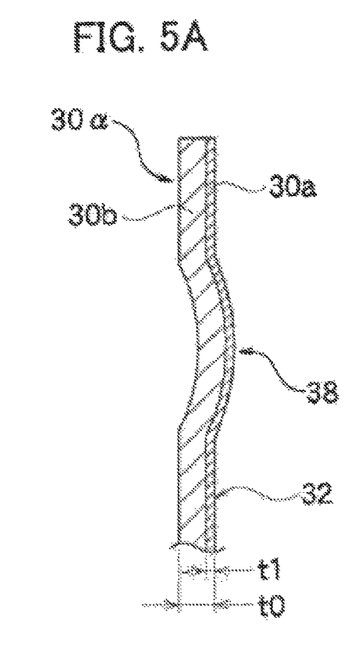
FIG. 5A is a cross sectional view of a main part of an external terminal used for an electronic device according to another embodiment of the present invention.

FIG. 5A is a cross sectional view of a main part of an external terminal used for an electronic device according to another embodiment of the present invention. The electronic device of the present embodiment has the same structure and demonstrates the same effect as the electronic devices according to First to Third Embodiments mentioned above except for the following matters, and common parts are provided with common member codes and are not described.

As shown in FIG. 5A, the metal terminal 30α is constituted by a clad material having a two-layer multilayer structure of a first metal 30a connected with the end surface electrode parts 22a via the solders 50 and a second metal 30b arranged outside the first metal 30a. The first metal 30a has a thermal expansion coefficient that is smaller than that of the ceramic element body 26. Preferably, the difference in thermal expansion coefficient between the first metal 30a and the ceramic element body 26 is 0.5 ppm or more. The thermal expansion coefficient of the ceramic element body 26 depends on the material of the dielectric layers, but is normally (6 to 14)×$10^{-6}$/K.

The first metal 30a is preferably an iron based alloy, such as 42Ni—Fe, 36Ni—Fe, 52Ni—Fe, 50Ni—Fe, 30Ni—Fe, 32Ni-5Co—Fe, and 29Ni-16Co—Fe. The first metal 30a is not limited to an iron based metal as long as the first metal 30a has a smaller thermal expansion coefficient than that of the ceramic element body 26, and may be SUS410, SUS430, Ni., or the like.

In the present embodiment, the second metal 30b has a thermal expansion coefficient that is larger than that of the ceramic element body 26. Preferably, the difference in thermal expansion coefficient between the second metal 30b and the ceramic element body 26 is 1 ppm or more.

The second metal 30b having a thermal expansion coefficient that is larger than that of the ceramic element body 26 is preferably a nonferrous metal, such as copper, copper alloy, aluminium, aluminium alloy, zinc, and zinc alloy.

Alternatively, the second metal 30b may be a metal whose electric resistance is smaller than that of the first metal 30a, such as copper, copper alloy, aluminium, aluminium alloy, zinc, and zinc alloy. Preferably, the difference in thermal expansion coefficient between the first metal 30a and the second metal 30b is 3×$10^{-8}$ Ω·m or more. Incidentally, the first metal 30a preferably has an electric resistance of (5 to 100)×$10^{-8}$ Ω·m by volume resistivity.

As a preferable combination, the first metal 30a is 42Ni—Fe or 36Ni—Fe, and the second metal 30b is copper or copper alloy. A total thickness t0 of the metal terminal 30α consisting of a two-layer multilayer structure of the first metal 30a and the second metal 30b is not limited, but is preferably 0.05 to 0.2 mm.

A thickness t1 of the first metal 30a is preferably 10 μm or more at minimum. The maximum value of the thickness t1 of the first metal 30a is determined by balance with the total thickness t0, and is preferably determined so that t1/t0 is ½ or less. When the thicknesses t0 and t1 are configured in the above manner, an effect of reducing a stress at a connection part of the external terminal (for example, at a connection part by the solders 50) is increased, and the effect of ESR is also improved.

In the manufacture of the metal terminal 30α, a planar two-layer multilayer clad metal plate material is firstly prepared. Next, the metal plate material is mechanically machined so as to obtain the metal terminal 30α shown in FIG. 5A.

In the present embodiment, the first metal 30a has a thermal expansion coefficient that is smaller than that of the ceramic element body 26. In the present embodiment, a stress at a connection part of the metal terminal 30α (for example, the connection part by the solders 50) can be thus reduced. When the stress is reduced, the strength at the connection part between the terminal electrode 22 of the ceramic element body 26 and the metal terminal 30α is improved, and reliability such as thermal shock resistance is also improved.

In the present embodiment, the second metal 30b has a thermal expansion coefficient that is larger than that of the ceramic element body 26. The second metal 30b, which has a larger thermal expansion efficient than that of the ceramic element body 26, normally has a low electric resistance and can improve an equivalent series resistance (ESR) of the electric component. In particular, when a metal with an electric resistance that is lower than that of the first metal 30a, such as copper and copper alloy, is used as the second metal 30b, the equivalent series resistance (ESR) of the electric component 10 can be improved.

In the present embodiment, the second metal 30b has a thickness along the lamination direction of the clad material that is larger than that of the first metal 30a. This configuration improves the reduction effect of the stress at a connection part of the metal terminal 30α (for example, the connection part by the solders 50) and also improves the effect of the ESR. Incidentally, in the present embodiment, the terminal electrode connection part 32 is the only one that is the two-layer multilayer structure between the first metal 30a and the second metal 30b, and the link part 36 and the mounting connection part 34 may be constituted by only the second metal 30b, which has an electric resistance that is lower than that of the first metal 30a.

Fifth Embodiment

Figure 5B:
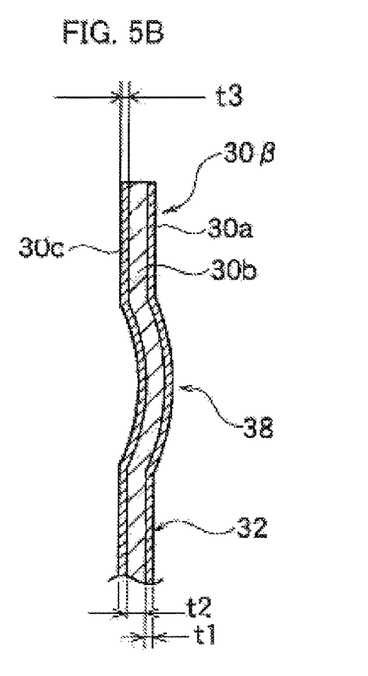
FIG. 5B is a cross sectional view of a main part of an external terminal used for an electronic device according to further another embodiment of the present invention.

FIG. 5B is a cross sectional view of a main part of an external terminal used for an electronic device according to another embodiment of the present invention. The electronic device of the present embodiment has the same structure and demonstrates the same effect as the electronic devices according to First to Fourth Embodiments mentioned above except for the following matters, and common parts are provided with common member codes and are not described.

As shown in FIG. 5B, the metal terminal 30β is constituted by a clad material having a three-layer multilayer structure of a first metal 30a connected with the end surface electrode parts 22a via the solders 50, a second metal 30b arranged outside the first metal 30a, and a third metal 30c arranged outside the second metal 30b. In the present embodiment, the first metal 30a and the third metal 30c have a thermal expansion coefficient that is smaller than that of the ceramic element body 26.

The first metal 30a and the third metal 30c are preferably constituted by the same metal, but may be constituted by different metals. In any case, the metal terminal 30β constituted by the three-layer structure of the first metal 30a, the second metal 30b, and the third metal 30c has a thermal expansion coefficient that is smaller than that of the ceramic element body 26.

As a preferable combination, the first metal 30a is 42Ni—Fe or 36Ni—Fe, the second metal 30b is copper or copper alloy, and the third metal 30c is 42Ni—Fe or 36Ni—Fe.

A thickness t1 of the first metal 30a is preferably 10 μm or more at minimum. The maximum value of the thickness t1 of the first metal 30a is determined by balance with the total thickness t0, and is preferably determined so that t1/t0 is ½ or less. A thickness t2 of the second metal 30b is preferably 20 μm or more at minimum. The maximum value of the thickness t2 of the second metal 30b is determined by balance with the total thickness t0, and is preferably determined so that t2/t0 is ⅔ or less.

Furthermore, a thickness t3 of the third metal 30c is preferably 10 μm or more at minimum. The maximum value of the thickness t3 of the third metal 30c is determined by balance with the total thickness t0, and is preferably determined so that t3/t0 is ½ or less. The thickness t3 of the third metal 30c may be the same as or different from the thickness t1 of the first metal 30a, but is preferably configured so that a total thickness of (t1+t3) is larger than the thickness t2.

That is, a constitution ratio (t2/t0) of the second metal 30b to the metal terminal 30β is smaller than a sum ((t1+t3)/t0) of the constitution ratios of the first metal 30a and the third metal 30c. Incidentally, when the first metal 30a connected with the terminal electrode 22 has a volume resistivity that is higher than that of the second metal 30b, the thickness t1 is preferably smaller than the thickness t2 and may be smaller than the thickness t3.

When the thicknesses t0 to t3 are configured in the above manner, the effect of reducing a stress at a connection part of the external terminal (for example, at the connection part by the solders 50) is increased, and the effect of ESR is improved.

Incidentally, in the present embodiment, a part of the metal terminal 30β corresponding to the terminal electrode connection part 32 may be only constituted by a three-layer multilayer clad consisting of the first metal 30a, the second metal 30b, and the third metal 30c. The mounting connection part 34 and the link part 36 may be constituted by only the second metal 30b. In this case, a volume of the second metal 30b is increased, and it is thus expected that the ESR improves, and that the effect of stress reduction at the connection part by the solders 50 is demonstrated.

In the present embodiment, the metal terminal 30β with the three-layer multilayer structure has a thermal expansion coefficient that is smaller than that of the ceramic element body 26. In the present embodiment, it is thus possible to reduce a stress at a connection part of the metal terminal 30β (for example, at the connection part by the solders 50). When the stress is reduced, the strength at the connection part between the terminal electrode 22 of the ceramic element body 26 and the metal terminal 30β is improved, and reliability such as thermal shock resistance is also improved.

In the above-mentioned embodiments, the first metal 30a and the third metal 30c are constituted by a metal having a smaller thermal expansion coefficient than that of the ceramic element body 26, and the second metal 30b is constituted by a metal having a larger thermal expansion coefficient than that of the ceramic element body 26, but the opposite may be employed. That is, the first metal 30a and the third metal 30c may be constituted by a metal having a larger thermal expansion coefficient than that of the ceramic element body 26, and the second metal 30b may be constituted by a metal having a smaller thermal expansion coefficient than that of the ceramic element body 26.

In this case, however, the constitution ratio (t2/t0) of the second metal 30b to the external terminal 30β is preferably larger than a sum ((t1+t3)/t0) of the constitution ratios of the first metal 30a and the third metal 30c. In this case, it is expected that the first metal 30a and the third metal 30c are constituted by a metal having a lower electric resistance than that of the second metal 30b. Then, the second metal 30b constitutes the link part 36 and the mounting connection part 34 in the embodiment shown in FIG. 4, and the first metal 30a or third metal 30c constituting the terminal electrode connection part 32 may continuously constitute the link part 36 and the mounting connection part 34 in this embodiment.

Other Embodiments

Incidentally, the present invention is not limited to above-mentioned embodiments, and can be variously changed within the scope of the present invention. For example, the terminal electrode 22 and the metal terminals 30, 30α, and 30β are connected using the solders 50 in the above-mentioned embodiments, but may be connected by a conductive adhesive or another connection means.

EXAMPLES

Hereinafter, the present invention will be described based on more detailed examples, but is not limited thereto.

Example 1

Two chip capacitors 20 whose length in the X-axis direction was 57 mm, length in the Y-axis direction was 50 mm, and length in the Z-axis direction was 25 mm were prepared. Furthermore, metal terminals 30 consisting of a single-layer phosphor bronze were prepared, the metal terminals 30 were connected with terminal electrodes 22 of the two chip capacitors 20 using solders 50, and 10 samples of electronic devices 10 shown in FIG. 1 and FIG. 2A were manufactured. Convex portions 38 had an outer diameter Φd of 0.5 mm, a protruding height H1 of 50 μm, a pitch interval Py of 1.1 mm, and a pitch interval Pz of 1.1 mm.

The 10 samples of electronic devices 10 were subjected to a thermal shock test. The thermal shock test was carried out in the following conditions. A thermal shock of temperature change from −55° C. to +125° C. was added to each sample every 2 minutes in 2000 cycles in a liquid tank. One of the chip capacitors connected with the metal terminal 30 and having cracks was visually found and judged as being bad.

The thermal shock test was conducted against the electronic devices 10 of Example 1. As a result, no sample out of the 10 samples was judged as being bad.

Comparative Example 1

10 samples of electronic devices were manufactured in the same manner as Example 1 except that no convex portions 38 were provided. A thermal shock test was conducted against the electronic devices of Comparative Example 1 in the same manner as Example 1. As a result, seven samples out of the 10 samples were judged as being bad.

Example 2

10 samples of electronic devices were manufactured in the same manner as Example 1 except that metal terminals were manufactured by single layer with 42Ni—Fe. A thermal shock test was conducted against the electronic devices of Example 2 in the same manner as Example 1. As a result, no sample out of the 10 samples was judged as being bad.

NUMERICAL REFERENCES

2 . . . dielectric layer
4 . . . internal electrode layer
10, 10α, 10β . . . electronic device
20, 20α, 20β . . . chip capacitor
22 . . . terminal electrode
22a . . . end surface electrode part
22b . . . side surface electrode part
26 . . . element body
30, 30α, 30β . . . metal terminal
30a . . . first metal
30b . . . second metal
30c . . . third metal
32 . . . terminal electrode connection part
34 . . . mounting connection part
36 . . . link part
38 . . . convex portion
50 . . . solder

The invention claimed is:

1. An electronic device comprising:
a plurality of chip components, each with a terminal electrode formed on an end surface of a ceramic element body;
an external terminal electrically connected with the terminal electrodes to support the plurality of chip components adjacently in a first direction, the external terminal comprising:
a mounting connection part connectable with a mounting surface; and
a terminal electrode connection part arranged to face the terminal electrodes, the terminal electrode connection part being provided with a plurality of convex portions protruding toward the terminal electrodes; and
a solder that does not enter a space between adjacent terminal electrodes, the solder connecting the terminal electrode connection part and each terminal electrode, the solder having a thickness corresponding to heights of the convex portions that are 20 to 120 μm,
wherein arrangement pitch intervals of the convex portions are 2 mm or less in both the first direction and a second direction that is perpendicular to the first direction and a width direction of the external terminal, and
the convex portions near side surface electrode parts of the terminal electrodes adjacently arranged in the first direction prevent wet spreading of the solder from reaching the connection portion of the side surface electrode parts of the terminal electrodes.

2. The electronic device according to claim 1, wherein the terminal electrode connection part of the external terminal has a multilayer structure of at least two metals.

3. The electronic device according to claim 2, wherein each terminal electrode has a cover film containing tin, and
side surfaces of terminal electrodes touching each other adjacently in the first direction are joined by tin and tin.

4. The electronic device according to claim 1, wherein each terminal electrode has a cover film containing tin, and
side surfaces of terminal electrodes touching each other adjacently in the first direction are joined by tin and tin.

5. The electronic device according to claim 1, wherein at least four convex portions are connected with each of the terminal electrodes along the second direction.

6. An electronic device comprising:
a plurality of chip components, each with a terminal electrode formed on an end surface of a ceramic element body;

an external terminal electrically connected with the terminal electrodes to support the plurality of chip components adjacently in a first direction, the external terminal comprising:
  a mounting connection part connectable with a mounting surface; and
  a terminal electrode connection part arranged to face the terminal electrodes, the terminal electrode connection part being provided with a plurality of convex portions protruding toward the terminal electrodes, each terminal electrode being connected with at least one of the plurality of convex portions; and
a solder that does not enter a space between adjacent terminal electrodes, the solder connecting the terminal electrode connection part and each terminal electrode, the solder having a thickness corresponding to heights of the convex portions that are 20 to 120 μm,
wherein the external terminal is constituted by a clad material having a two-layer structure of a first metal connected with an end surface electrode part via the solder and a second metal arranged outside the first metal, and
the convex portions near side surface electrode parts of the terminal electrodes prevent wet spreading of the solder from reaching the connection portion of the side surface electrode parts of the terminal electrodes adjacently arranged in the first direction.

7. The electronic device according to claim 6, wherein at least four convex portions are connected with each of the terminal electrodes along the second direction.

8. An electronic device comprising:
  a plurality of chip components, each with a terminal electrode formed on an end surface of a ceramic element body;
  an external terminal electrically connected with the terminal electrodes to support the plurality of chip components adjacently in a first direction, the external terminal comprising:
    a mounting connection part connectable with a mounting surface; and
    a terminal electrode connection part arranged to face the terminal electrodes, the terminal electrode connection part being provided with a plurality of convex portions protruding toward the terminal electrodes, each terminal electrode being connected with at least one of the plurality of convex portions; and
  a solder that does not enter a space between adjacent terminal electrodes, the solder connecting the terminal electrode connection part and each terminal electrode, the solder having a thickness corresponding to heights of the convex portions that are 20 to 120 μm,
wherein the external terminal is constituted by a clad material having a three-layer structure of a first metal connected with an end surface electrode part via the solder, a second metal arranged outside the first metal, and a third metal arranged outside the second metal, and
the convex portions near side surface electrode parts of the terminal electrodes adjacently arranged in the first direction prevent wet spreading of the solder from reaching the connection portion of the side surface electrode parts of the terminal electrodes.

9. The electronic device according to claim 8, wherein at least four convex portions are connected with each of the terminal electrodes along the second direction.

10. An electronic device comprising:
  a plurality of chip components, each with a terminal electrode formed on an end surface of a ceramic element body;
  an external terminal electrically connected with the terminal electrodes to support the plurality of chip components adjacently in a first direction, the external terminal comprising:
    a mounting connection part connectable with a mounting surface; and
    a terminal electrode connection part arranged to face the terminal electrodes, the terminal electrode connection part being provided with a plurality of convex portions protruding toward the terminal electrodes, each terminal electrode being connected with at least one of the plurality of convex portions;
  a metal cover film formed by plating on a surface of the external terminal; and
  a solder that does not enter a space between adjacent terminal electrodes, the solder connecting the terminal electrode connection part and each terminal electrode, the solder having a thickness corresponding to heights of the convex portions that are 20 to 120 μm,
wherein the terminal electrode connection part has a multilayer structure of at least two metals, and
the convex portions near side surface electrode parts of the terminal electrodes adjacently arranged in the first direction prevent wet spreading of the solder from reaching the connection portion of the side surface electrode parts of the terminal electrodes.

11. The electronic device according to claim 10, wherein at least four convex portions are connected with each of the terminal electrodes along the second direction.

* * * * *